United States Patent [19]

Barshad

[11] Patent Number: 4,804,266

[45] Date of Patent: Feb. 14, 1989

[54] CONTINUOUSLY ROTATING GRATING RAPID-SCAN SPECTROPHOTOMETER

[75] Inventor: Yoav Barshad, Rehovot, Israel

[73] Assignee: Barspec Ltd., Rehovot, Israel

[21] Appl. No.: 8,544

[22] Filed: Jan. 29, 1987

Related U.S. Application Data

[63] Continuation-in-part of Ser. No. 759,291, Jul. 26, 1985, Pat. No. 4,732,476.

[51] Int. Cl.$^4$ .............................. G01J 3/18; G01J 3/42
[52] U.S. Cl. .................................... 356/308; 356/328; 356/334
[58] Field of Search ............... 356/308, 309, 319, 326, 356/328, 331, 332, 334; 364/498

[56] References Cited

U.S. PATENT DOCUMENTS

| | | | |
|---|---|---|---|
| 3,447,873 | 6/1969 | Ashley et al. | 356/334 |
| 3,637,310 | 1/1972 | Naono | 356/309 |
| 4,293,222 | 10/1981 | Caruso et al. | 356/319 |
| 4,519,706 | 5/1985 | Morley et al. | 356/319 |

OTHER PUBLICATIONS

Angus, *U V Group Bulletin*, No. 8, Part 1, Jun. 1980, pp. 53–60.
Angus, *Optical Spectra*, vol. 14, No. 8, Aug. 1980, pp. 49–52.

Primary Examiner—F. L. Evans
Attorney, Agent, or Firm—James M. Deimen

[57] ABSTRACT

A system for rapid-scan spectral analysis comprising a concave holographic diffraction grating continuously rotated at a substantially constant angular velocity to provide a rapid scanning monochromator (a monochromator is used to transfer nominal regions of wavelengths out of the continuous light source). The unique sampling circuitry uses an optical shaft encoder. The angular velocity and angular acceleration of the grating are calculated from time measurements, just before the first wavelength of interest falls on the detector. This information is used to control the Analog to Digital converter sampling rate across the region of interest. The samples as a function of time are stored in a memory buffer so that each data point corresponds to a wavelength.

25 Claims, 3 Drawing Sheets

CONTINUOUSLY ROTATING GRATING RAPID-SCAN SPECTROPHOTOMETER

This application is a continuation-in-part of application Ser. No. 759,291, filed July 26, 1985, now U.S. Pat. No. 4,732,476.

BACKGROUND OF THE INVENTION

The field of the invention pertains to spectrophotometry and, in particular, to rapid-scan spectrophotometers and the speed with which such instruments can scan the relevant spectra.

In well known mechanical scanning spectrophotometers the entrance and exit slits are located on either side of the optical grating. A simple ellipticaly concave mirror is used as a collimating and focusing mirror intersecting and directing the light from an ultraviolet or visual light generator for a UV/VIS spectrophotometer. The light beams entering the monochromator strike the left side of the mirror, aare collimated and reflected to the grating. The diffracted radiation goes to the right half of the same mirror and is focused on the exit slit. The wavelength is selected by simple pivoting of the grating about the monochromator axis. The angle between the incident and diffracted rays remains constant. Either a manual or motor driven sine bar drive produces a direct wavelength readout on a linear scale.

Since the useful range in UV/VIS spectroscopy lies typically within a few degrees about the grating optical axis, the grating is rotated back and forth over this range to scan the region of interest. Mechanical scanning of the desired spectrum is achieved through a device such as a stepping motor. The information from a shaft encoder thereattached is used to translate the angular position of the grating into a wavelength.

Spectrophotometers that rely upon such electromechanically reversing arrangements for the grating cannot truly be considered rapid scanning, because they typically scan about 400 to 2400 nm per minute. The arrangement cannot be increased in speed because of the mechanical cam shaft follower drive and the need to determine the grating position accurately.

Full electronic spectroscopy has been achieved with diode array spectrophotometers that scan the range of 200 to 800 nm many times per second. Such spectrophotometers require custom-made circuits with attendant high cost for limited production. Diode arrays have a limited spectral response, require a "reverse optics" configuration. Extension into the near and far infra red remains unavailable without arrays of hundreds or thousands of elements.

High-throughput spectroscopy can also be accomplished with a fast mechanical scanner with all reflective optics. Scanning is achieved by vibrating a low-inertia grating or mirror as disclosed in U.S. Pat. No. 4,225,233 and the paper by J. Stoijek and Z. Uziel, Pol. J. Chem., 53, 1619 (1979). The mirror or grating (depending on the optical configuration) is mounted directly on the output shaft of a galvanometer type optical scanner, where the position is a function of the applied electric current. By changing the source, grating, and detector, a wide wavelength range can be covered. A commercial device based on U.S. Pat. No. 4,070,111 is available presently with a vibrating grating. Unfortunately, the scanning speed, although much greater than with the electro-mechanical scanner above, caused increased optical difficulties. To minimize intertia the grating or mirror is very small. A large number of optical elements, fixed magnification between the entrance and exit slits and a high energy input light source are required.

U.S. Pat. No. 4,245,911 discloses a drum cam mechanical drive to oscillate the grating and means to adjust the scanning speed. U.S. Pat. Nos. 4,264,205 and 4,285,596 disclose a conjugate cam mechanical drive to oscillate the grating. In both disclosures the mechanical drive is directed to retaining the accuracy of the mechanical drive and to eliminate backlash the mechanical parts thereby reducing noise in the measurements at high scanning speeds. All such mechanical oscillating drives for the grating are inertia limited because of the reversal of movement in each cycle.

SUMMARY OF THE INVENTION

Applicant has developed a rapid-scan spectrophotometer for UV/VIS spectroscopy (but not limited to) at scanning speeds comparable to diode arrays without the limitations of spectral resolution, "reverse optics", spectral range and high cost. Objectives of the new monochromator and spectrophotometer are to mechanically scan at high speed with a high-inertia, concave holographic grating, to minimize the number of optical elements and to integrate the data acquisition and system control into one function.

The new spectrophotometer features a grating drive mechanism that enables the recording of ten complete absorption spectra per second with wavelength accuracy of better than 1nm. This scanning mechanism can scan the UV, visible and even NIR wavelengths. As it uses conventional optics with both inlet and exit slits, the bandwith is well defined resulting in lower stray light and higher sensitivity. The use of a single detector element means that the UV enhancement of the detector surface is significantly better than a diode array. The unique scanning mechanism also allows for continuous dark current correction resulting in lower drift. All these features result in a high quality, low noise, low drift spectrophotometer.

The spectrophotometer according to the present invention is provided with a data acquisition system which system is only dependent on the sensed position of the grating, provided by a shaft encoder and vertified by the naturally occurring effect of the zero order spectrum (white light) which is directly dependent on the position of the grating. Therefore the need for feedback circuits and associated servo systems to regulate the angular velocity of the rotation of the grating is eliminated. An approximately constant angular velocity may be provided by a suitable drive motor and smoothed out by the flywheel effect of the turntable attached to the grating. The exact angular position of the grating is calculated by measurements of the rotational speed and acceleration immediately preceding the angular section of interest.

To accomplish the rapid-scan with a mechanical drive for the grating, the grating is affixed to a relatively high inertia fully rotatable turntable which continuously rotates the grating about its optical axis. The grating is rotated at a suitable angular velocity which should be constant. By adding mass to the turntable and thereby increasing the inertia of the rotating mass, the flywheel effect is increased. Thus, the sampling cycle may be termed "free flying".

The optical region of interest is approximately 15 degrees (depending on application) of the rotation sweep as with the oscillating gratings, therefore means are provided to select and coordinate the scanning with the angular position of the grating.

The (free flying) sampling cycle starts with the zero order light (white light) falling on the detector. This signal is easily distinguished from spectral signals (due to its intensity), giving an accurate position of the grating once per revolution. An index pulse (coming from the shaft encoder) is generated immediately after the zero order for synchronization purposes and verification of the shaft encoder position.

Shortly before the first wavelength of interest appears at the exit slit, a suitable trigger circuit starts the sampling cycle; this may be easily determined from the above data. Once the sampling cycle is started, pulses from the shaft encoder, which may be spaced at angular positions corresponding to, e.g. 20 nm, are fed into a logic circuit. This logic circuit, using the principle that the velocity profile can be determined assuming constant acceleration, interpolates pulses corresponding to the desired wavelengths. If required, the grating equation may be used at this point to correct for slight non-linearity between the angular displacement and wavelength.

The pulses delivered by said logic circuit are fed to a sampling A/D converter circuit. This circuit also continuously receives the voltage value (suitably processed) from the detector measuring the intensity of the light falling thereon after passing through the sample cell. Said sampling - A/D converter circuit samples this continuous voltage input for each pulse received and optionally digitizes same. The output of this circuit is a function of the intensity of the light falling on the detector relative to the wavelength. Thus, the desired spectrum appears in digitized form.

This is the primary output of the presently claimed spectrophotometer and may be stored in a suitable memory or possible displayed on a CRT (this may be done also by utilizing the sample voltages without digitizing same), or otherwise utilized in conventional ways.

In order to take advantage of the fact that only a fraction of the time necessary for the rotation of the grating is utilized for measuring a spectrum, and the remainder is available as free time, further circuitry has been devised which may be optionally used with the spectrophotometer of the invention.

This additional circuitry includes a scratch-pad memory, receiving the data for each revolution (digitized light intensity as a function of wavelength) in real time. These values are then stored for further processing at a slower rate and the scratch-pad memory cleared, enabling the scratch-pad memory to accept a new spectrum prior to the beginning of the next sampling cycle.

This data handling/computing circuitry may be accessed as desired to retrieve any valuable information, and also programmed to transfer required information such as absorption values for pre-determined selected wavelenths, directly successive to processing units. Alternatively such information may be transferred to non-volatile storage or discarded. Of course, the successive processing unit may also be programmed to retrieve information from said non-volatile storage for comparison or computing purposes.

Although disclosed herein with respect to UV/VIS spectroscopy, the Applicant's spectrophotometer can be adapted to infra red spectroscopy with a suitable source, detector and sample cell.

DESCRIPTION OF THE PREFERRED EMBODIMENT

Figure 1:
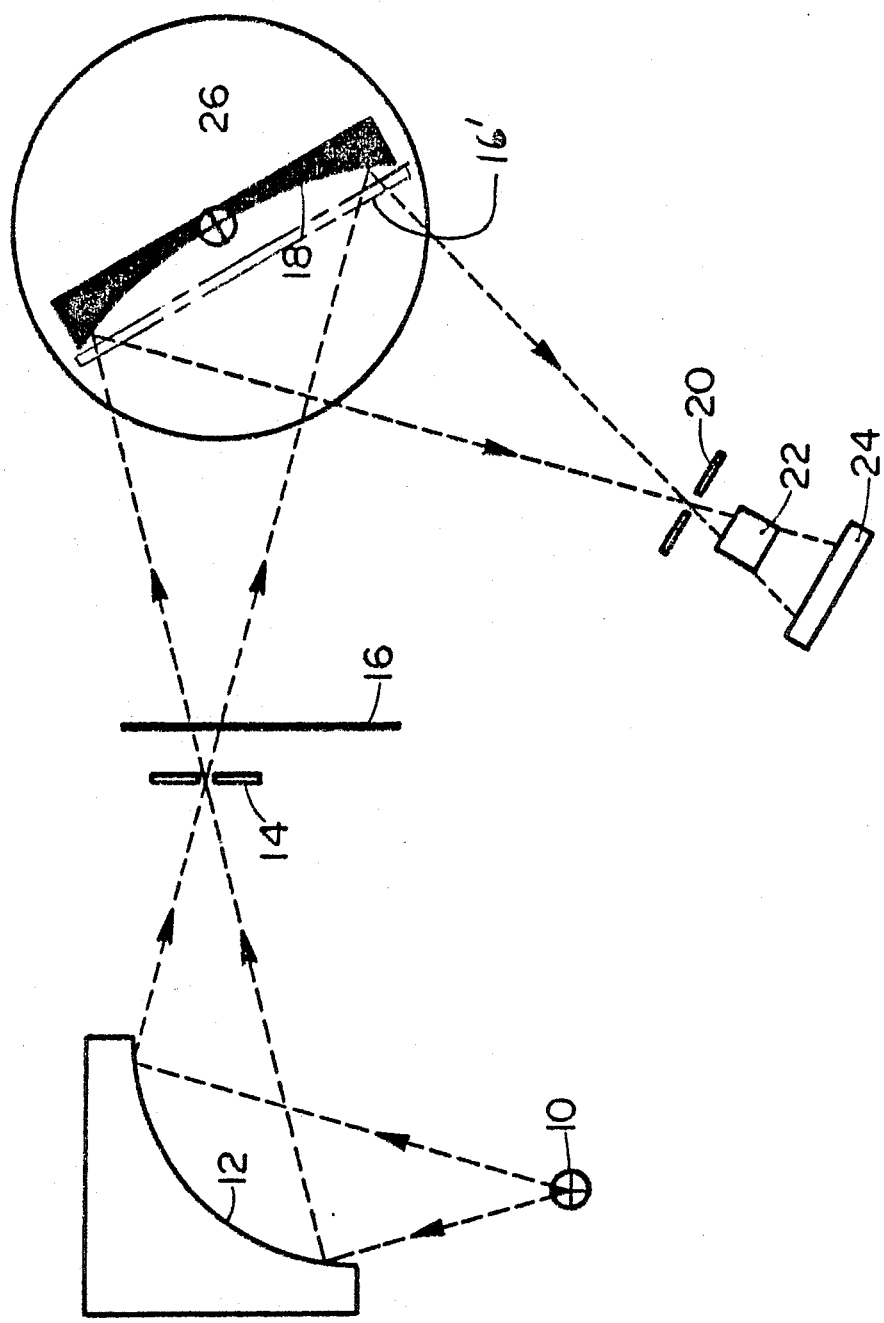
FIG. 1 is a schematic plan view of the new optical apparatus.

Illustrated in FIG. 1 is a light source comprising a light generating device 10 and an elliptically curved concave mirror 12. The light generating device 10 provides polychromatic light in the ultraviolet, visual or infra-red region as required. For the more common uses of a spectrophotometer, a visual range or ultra-violet range light source is selected. Recently availabe are combined ultra-violet/visual range light sources (UV/VIS). Such a light source provides a complete spectrum over the UV/VIS range most commonly used. The light reflected from the concave or elliptical mirror 12 is directed through a slit 14 and an optional filter wheel 16 to impinge upon a rotating optical grating 18. The optical grating 18 rotates about its optical axis with a preselected angular velocity. The light reflected from the optical grating 18 is then directed to and through a second slit 20 and through a sample chamber 22 to finally impinge upon a detector 24. The rotating optical grating 18 is mounted on a relatively heavy turntable 26.

As shown, the filter wheel 16 is located just beyond the entrance slit 14. However, the filter wheel may be positioned ahead of the entrance slit 14 or on either side of the exit slit 20. The purpose of the filter wheel is to delete certain wave lengths from the spectrum sample and is a well known option in the spectroscopy field. Typically, the light generating means 10 is either a bulb providing the visual spectrum or a bulb providing the ultra-violet spectrum. However, a new bulb new being introduced by Hamamatsu Instruments of Japan provides the full range of ultraviolet and visual wavelengths from a single point source.

Figure 2:
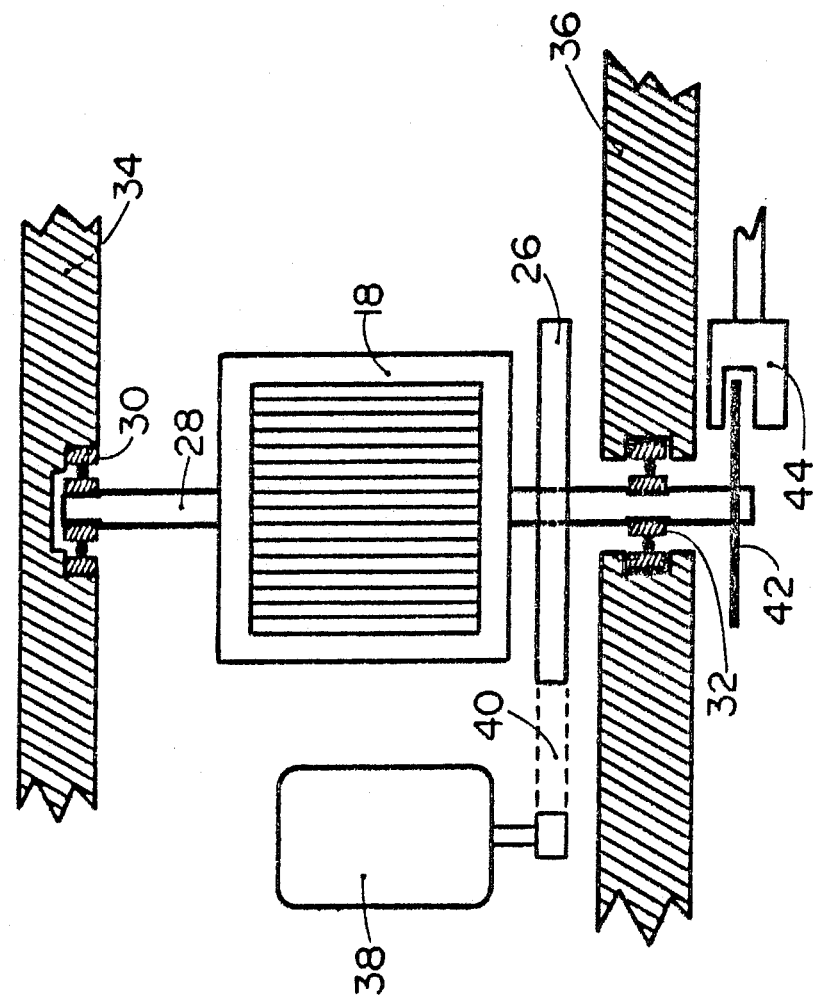
FIG. 2 is a schematic side cross-sectional view of the rotating optical grating and associated electromechanical apparatus.

The supporting wheel or turntable 26 for the optical grating 18 is preferably relatively heavy so as to act as a flywheel. The optical grating 18 itself may be suitably heavy because the increased inertia in the rotating assembly is advantageous in this spectrophotometer. Increased mass helps to retain a relatively constant angular velocity. Referring to FIG. 2 the optical grating 18 and flywheel 26 are mounted on a vertical shaft 28 in turn mounted in bearings 30 and 32. The bearings as shown schematically at 30 and 32 are in turn mounted in a rigid supporting structure 34 and 36. The bearings 30 and 32 are selected for rotational accuracy to eliminate any possibility of translational vibration being transmitted to the optical grating 18. Illustrated next to the flywheel 26 and optical grating 18 is a drive motor 38 which is connected 40 to the flywheel 26. A suitable drive system may be a floppy disk drive motor or tape drive motor, selected from the many available for computers. Such a drive in combination with a relatively heavy fly wheel 26 will assure a sufficiently constnat rotational velocity for the optical grating 18. Also affixed to the shaft 28 is an optical incremental shaft encoder 42,44 such as the HEDS 5000 by Hewlett Packard, which provides 500 pulses per revolution and an index pulse.

Figure 3:
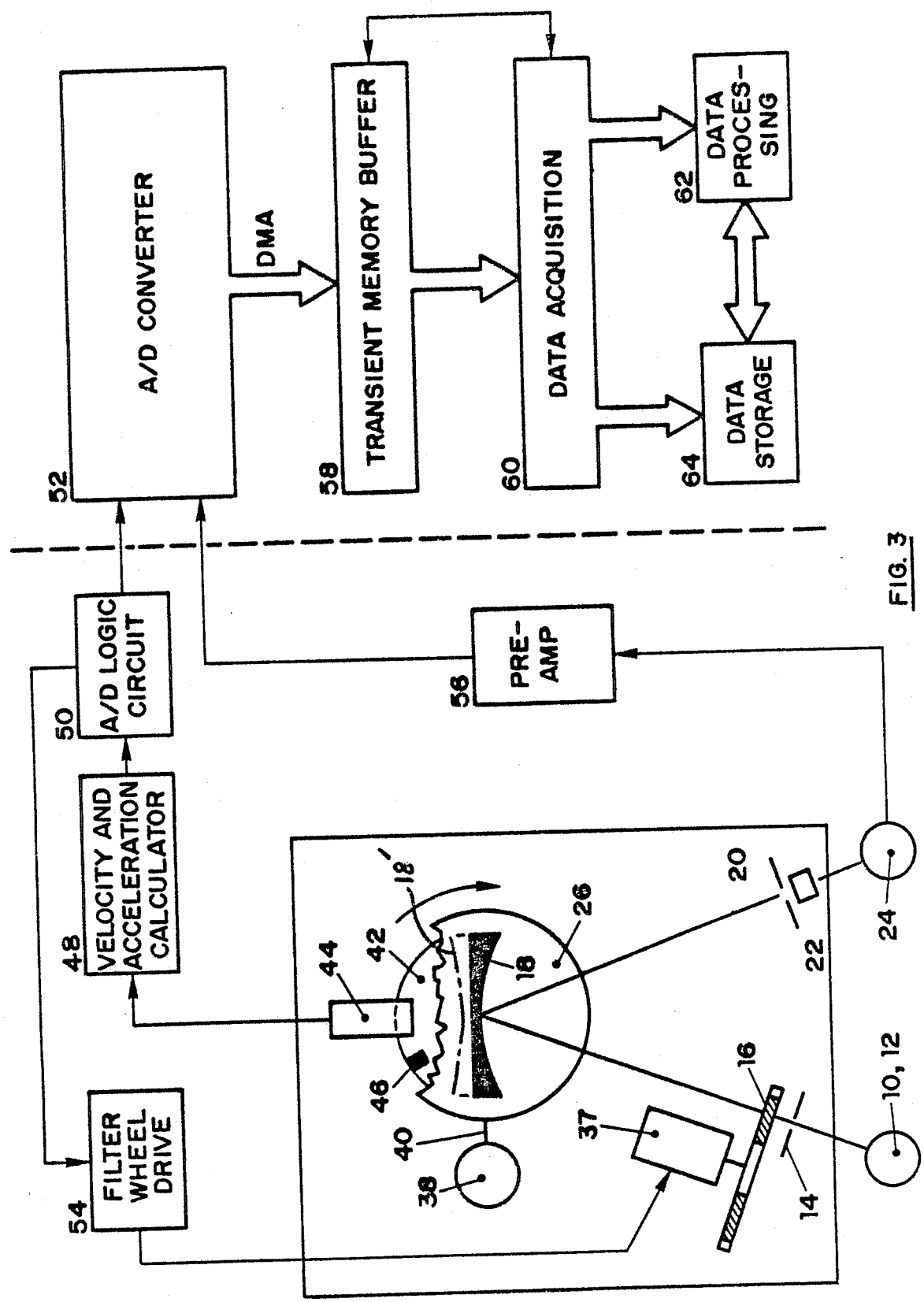
FIG. 3 is a flow diagram of the spectrophotometer apparatus and the associated hardware for processing the electrical output from the spectrophotometer detector.

To the left side of FIG. 3 is a brief schematic of the spectrophotometer apparauts shown in FIG. 1. The light source to the lower left is the combination of the light generating means 10 and elliptical focusing mirror 12. As schematically shown in FIG. 3, the position of the index on the shaft encoder 42,44 is shown as a dark spot 46 that is about to enter the optical head 44 of the encoder.

Referring again to FIG. 3 the pulses coming out of the shaft encoder assembly 42, 44, 46 are fed into the velocity and acceleration calculator 48, the output of which is used to control A/D logic circuit 50. This logic circuit 50 comprises: timing circuitry adapted to measure the time intervals between successive pulses delivered by the optical head 44 of the encoder; memory for storing such successive time intervals (a number [n] of such time intervals being measured); computing means for extrapolating from the above data the expected time interval [n+1] for the angular distance between the two following markings and circuitry interpolating pulses corresponding to the angular positions representing the selected wavelengths.

The wavelengths interpolated in time interval [n+1] are preferably equally spaced. This is based on the assumption that the angular velocity of the grating in the time interval corresponding to a few shaft encoder markings is sufficiently constant to justify such extrapolation and interpolation.

In each revolution, the naturally occurring phenomena of the zero order spectrum (polychromatic light), directly depends on the position of the grating. One instant each revolution, the grating acts as a simple mirror reflecting polychromatic light onto the detector. This signal, together with the index pulse initiated by dark spots 46 of the shaft encoder, which occurs once per revolution, is used by the calibration algorithm, to verify the angular position of the grating. The zero order is a strong signal easily distinguished from the subsequent spectral data.

The index pulse is also fed to the filter wheel drive 54. The purpose of this filter depends on the location thereof, either to eliminate undesired wavelengths from the incident light (when located between the entrance slit 14 and the grating 18) or to prevent higher order spectra from reaching the detector (when located between the grating 18 and exit slit 22).

By way of example, if the spectrum is to be scanned from 200 to 600 nm, it is possible to scn the section from 200 to 370 nm in one scan, advance the filter wheel 18 and then the section from 370 to 600 nm is scanned in the next revolution. This necessarily lowers the time resolution of the instrument.

The filter wheel control 54 causes the filter wheel motor 37 to rotate the filter wheel 16 in synchronization with turntable 26. As said above, the location of the first wavelength of interest may be easily calculated from the position of the zero order signal and the index pulse. It is important that the utilization of the zero order signal, which is independent of the shaft encoder and dependent only on the actual angular position of the grating for continuous calibration, eliminates possible errors stemming from changes in the relative position of the grating and the shaft encoder. In effect, the grating angular position is then recalibrated with each revolution.

The electric signal from detector 24 (an analog value) is fed to the pre-amplifier 56. The A/D circuit 52 samples this electrical signal for every pulse received and digitizes the sample values, if desired.

The result of this intermediate information processing stage is the desired spectra in the form of light intensity values as a function of wavelength.

This intermediate result may be utilized directly in conventional ways, as above said, but the preferred embodiment of the invention is to transfer the output of the A/D circuit 52 in digital form to a scratch-pad memory 58 in real time for temporary storage.

A computer and a program may be provided for transferring the data through the data bus of the computer to a fixed memory location, at a rate adequate for transfereing the data representing a single scan, thus preparing the scratch-pad memory for receiving a fresh burst of data representing the following revolution and scan. The unit for receiving the data and transferring the data for processing or to more permanent memory locations, possibly after appropriate selection and/or calculation is herein termed a data acquisition unit 60. The data acquisition unit 60 is followed by data processing unit 62 and data storage unit 64, two units which are interconnected and may be programmed in a variety of ways.

Another unique feature of the monochromator of the present invention is the dark current measurement and compensation.

A well known problem with detector such as those of the silicone diode type used herein is that due to thermal effects, an output signal arises despite the lack of incident light. This, termed the dark current, must be compensated. Heretofore a most common way to accomplish such compensation is to activate a shutter to block the light and then measure the dark current.

According to the present invention, an almost continuous correction may be applied by measuring the detector output during the time for each revolution at which the back surface of the grating faces the detector. This back surface may be made non-reflecting by anodizing and coating with a non-reflecting material. The dark current output of the detector may be utilized at any suitable stage of the data acquisition process to correct the measured detector output The most suitable point may be the data acquisition unit 60 where this dark current value can be temporarily stored in an appropriate memory location since this value is not concurrent with the spectral measurement data. However, since the time interval between measuring the spectrum and the dark current in the same revolution is very short, there is a distinct advantage. The possible error due to a drift in the dark current value is minimized, thereby decreasing thermal instability effects and reducing long term noise.

The applications of applicant's new spectrophotometer are manifold. For example, for routine measurements and slow scan, the rapid scan of the instrument permits each spectral element to be represented as a value and corresponding statistical uncertainty. In kinetics, wherein the concentrations of various species are followed as a function of time, to study their dynamic behavior, the new spectrophotometer is capable of acquiring at least ten complete spectra per second (200 nm to 800 nm) with one nm resolution. The new instrument can be used for spectroelectrochemistry, stop flow kinetics and as a detector for liquid chromatography (HPLC) or gas chromatography.

Measuring changes in absorbance in samples that are highly heterogeneous is difficult due to scattering. To correct for the scattering effect, light of two different wave lengths is used, one where there is absorbance in the sample and one where there is no absorbance to thereby detect the attenuation caused by scattering. Because a complete spectrum can be collected in a fraction of a second, information coming from two different wave lengths can be considered to be acquired virtually simultaneously, and the dual wave length spectroscopy correction can be applied with a minimum of error.

Other modifications of the spectrophotometer can be added. Because added mass is of benefit to the accuracy of operation of applicant's device, as shown ghosted in FIG. 3, a second grating 18' mounted back to back with the first grating and a second triggering means 46' on the rotating flywheel or shaft permit a double sampling rate at the same angular velocity. Secondly, as shown ghosted in FIG. 1, filters 16' can be mounted on the rotating turntable or flywheel 26 in front of the optical grating 18 to remove second order and other harmonic wavelengths without any weight penalty. Thus, features that cannot be added to the prior art oscillating and vibrating optical gratings without severly impairing the scanning speed, can be added to the continuously rotating optical grating of applicant not only without penalty but with the added advantage that the increase in inertia is of benefit to the accuracy of applicant's spectrophotometer.

I claim:

1. A monochromator comprising:
   a source of polychromatic radiation and means to direct the radiation to an optical grating,
   an optical grating located in the path of said radiation, said grating being mounted to a shaft for rotation,
   a turntable of relatively high mass mounted on the shaft for rotation with the shaft,
   means for continuously rotating the shaft and grating at an approximately constant uninterrupted angular velocity,
   an exit slit positioned to intercept radiation reflected from said optical grating,
   a shaft encoder assembly mounted on and adjacent said shaft to deliver information representing specific angular positions of the shaft, and
   an electronic logic circuit delivering pulses in response to information received from said shaft encoder assembly whenever a specific wavelength is to appear at the exit slit.

2. The monochromator as claimed in claim 1 wherein the grating is rotated about its optical axis.

3. The monochromator as claimed in claim 1 wherein said logic circuit defines the position at which said specific wavelength appears at the exit slit by sensing the angular velocity and acceleration of the grating.

4. The monochromator as claimed in claim 3 wherein said shaft encoder assembly produces index pulses and said logic circuit delivers a pulse whenever a specific wavelength appears at the exit slit by interpolating the time interval between two successive index pulses delivered by the shaft encoder assembly.

5. A monochromator as claimed in claim 1 wherein the means of rotating the grating include a motor and a motor control to set the motor speed.

6. The monochromator as claimed in any of claims 1 to 5 inclusive additionally comprising a filter wheel synchronized with the rotation of the grating.

7. A spectrophotometer incorporating a monochromator comprising:
   a source of polychromatic radiation and means to direct the radiation to an optical grating,
   an optical grating located in the path of said radiaiton, said grating being mounted to a shaft for rotation, whereby the grating is rotated about its optical axis,
   a turntable of relatively high mass mounted on the shaft for rotation with the shaft,
   a motor and a motor control to set the motor speed for continuously rotating the shaft and grating at an approximately constant uninterrupted angular velocity,
   an exit slit positioned to intercept radiation reflected from said optical grating,
   a shaft encoder assembly mounted on and adjacent said shaft to deliver information representing specific angular positions of the shaft,
   an electronic logic circuit delivering pulses in response to information received from said shaft encoder assemlby whenever a specific wavelength is to appear at the exit slit,
   wherein said logic circuit defines the position at which said specific wavelength appears at the exit slit by sensing the angular velocity and acceleration of the grating, and
   wherein said shaft encoder assembly produces index pulses and said logic circuit delivers a pulse whenever a specific wavelength appears at the exit slit by interpolating the time interval between two successive index pulses delivered by the shaft encoder assembly, and
   additionally comprising a sample cell through which the monochromatic radiation delivered by the monochromator passes and a detector intercepting the radiation creating an electrical signal representing the intensity of the radiation passing through said sample cell.

8. The spectrophotometer as claimed in claim 7 additionally comprising a filter wheel synchronized with the rotation of the grating.

9. The spectrophotometer as claimed in claim 7 including a non-reflecting back surface of the grating, and additionally including continuous dark current compensation obtained by measuring the electrical dark current signal produced by the detector when the non-reflecting back surface of the grating intercepts the radiation and means for correcting the signal values representing spectral data with the dark current signal value.

10. A spectrophotometer comprising: a source of polychromatic radiation and means to direct the radiation to an optical grating,
   an optical grating located in the path of said radiation,
   a rotatable shaft attached to said grating,
   a turntable of relatively high mass attached to said shaft,
   means for continuously rotating the shaft, turntable and grating at an approximately constant uninterrupted angular velocity,
   an angular shaft encoder assembly mounted on and adjacent said shaft to deliver information representing specific annular positions of the shaft,
   an electronic logic circuit delivering pulses in response to information received from said shaft encoder assembly,
   a sample cell located in the path of monochromatic radiation from the rotating grating and a detector positioned to intercept the radiation exiting the sample cell, said detector creating an electrical signal representing the intensity of the radiation passing through said sample cell, and a sampling circuit receiving said pulses from the electronic logic circuit and continuously receiving the electrical signal from the detector to thereby sample the continuous electrical signal in response to pulses received and produce a spectrum of radiation intensity values relative to specific wavelengths.

11. The spectrophotometer as claimed in claim 10 wherein said sampled radiation intensity values are presented in digitized form.

12. A spectrophotometer as claimed in claim 10 incorporating a trigger circuit initiating the sampling cycle before the first wavelength of interest intercepts the detector.

13. The spectrophotometer as claimed in claim 12 wherein said angular shaft encoder assembly delivers an index pulse for each revolution and said trigger circuit starts the sampling cycle in response to said index pulse.

14. The spectrophotometer as claimed in claim 13 wherein the detector senses the zero order spectrum (polychromatic radiation reflected by the grating) and produces a signal by which the angular position of the shaft is verified by the relation of this signal to the index pulse.

15. The spectrophotometer as claimed in claim 11 including associated circuitry comprising a scratch-pad memory buffer receiving digitized data from said sampling circuit in real time and adapted to transmit said data to subsequent processing unit.

16. The spectrophotometer as claimed in claim 15 wherein the data from said scratch-pad memory buffer are transmitted to vacate the buffer for a burst of fresh data from the following scanning cycle during the next revolution of the grating.

17. The spectrophotometer as claimed in claim 15 including subsequent processing units comprising direct processing means, permanent storage and means for retrieving information from said permanent storage for processing in conjunction with said direct processing means.

18. The spectrophotometer as claimed in any of claims 10, 14, 15, 16 or 17 including a non-reflecting back surface of the grating, and additionally including continuous dark current compensation obtained by measuring the electrical dark current signal produced by the detector when the non-reflecting back surface of the grating intercepts the radiation and means for correcting the signal values representing spectral data with the dark current signal value.

19. A spectrophotometer comprising:
a source of polychromatic radiation and means to direct said radiation to an optical grating,
an optical grating located in the path of said radiation, said grating being mounted to a shaft for rotation about the optical axis of the grating at an approximately constant uninterrupted angular velocity,
a turntable of relatively high mass mounted for rotation with said grating,
a sample cell through which the radiation diffracted by the grating passes,
detector means to intercept said radiation and deliver a continuous electrical signal representing the intensity of radiation impinging on said detector means after passing thorough said sample cell,
means for sensing the actual angular position of said grating,
means for producing signal representing the selected wavelengths at which the spectral data are to be measured, and
means for sampling the continous electrical signal produced by said detector means in response to said signals representing said selected wavelengths.

20. The spectrophotometer as claimed in claim 19 wherein the means for sensing the actual position of the grating includes a pulse producing shaft encoder assembly mounted on and adjacent the shaft about which said grating is rotated.

21. The spectrophotometer as claimed in claim 20 wherein said means for producing signals representing said selected wavelengths include an electronic logic circuit producing signal pulses in response to pulses produced by the shaft encoder assembly, said electronic logic circuit sensing the actual angular rotational velocity and acceleration of the grating and interpolating to produce the signal pulses representing said selected wavelengths between two successive index pulses produced by the angular shaft encoder assembly.

22. The spectrophotometer as claimed in claims 20 or 21 wherein the shaft encoder assembly produces an index pulse for each revolution and the detector means senses the zero order spectrum impinging on the detector means and produces a zero order signal, the relative angular position of the shaft, grating and detector means being verified by the relation between said index pulse and said zero order signal to thereby continuously calibrate the shaft and grating to the detector means.

23. The spectrophotometer as claimed in claim 19 wherin the grating is rotated by means of a motor and motor control to set motor speed.

24. The spectrophotometer as claimed in claim 19 additionally comprising an optical filter wheel rotated in synchronization with the grating.

25. The spectrophotometer as claimed in claims 19 or 21 including a non-reflecting back surface of the grating, and additionally including continuous dark current compensation obtained by measuring the electrical dark current signal produced by the detector means when the non-reflecting back surface of the grating intercepts the radiation and means for correcting the signal values representing spectral data with the dark current signal value.

* * * * *